United States Patent [19]

Morris

[11] 4,230,755

[45] Oct. 28, 1980

[54] MOLDABLE UNITARY COMPOSITE CARPET STRUCTURE

[75] Inventor: Robert W. Morris, Shermans Dale, Pa.

[73] Assignee: C. H. Masland & Sons, Carlisle, Pa.

[21] Appl. No.: 744,312

[22] Filed: Nov. 23, 1976

[51] Int. Cl.³ .................. B32B 5/18; D04H 11/00
[52] U.S. Cl. ........................ 428/95; 428/96; 428/215; 428/315
[58] Field of Search ............ 428/95, 96, 213, 215, 428/160, 315

[56] References Cited

U.S. PATENT DOCUMENTS

| 3,926,700 | 12/1975 | Hopkins | 428/95 |
| 3,940,525 | 2/1976 | Ballard | 428/95 |
| 3,979,487 | 9/1976 | Squier | 428/95 |

Primary Examiner—Marion McCamish
Attorney, Agent, or Firm—Scrivener, Parker Scrivener and Clarke

[57] ABSTRACT

A flat unitary composite carpet structure which can be hot molded permanently into non-planar shapes conforming to contoured surfaces such as automobile floors has an exposed textile surface to the underside of which is adhered a relatively thick layer of polyurethane foam which provides good fiberbonding, tuftbinding and sound deadening qualities to the composite carpet structure, and to the underside of the polyurethane foam layer is adhered a relatively thin layer of polyethylene which provides good shape retention qualities to the composite carpet structure and provides means for adhesively attaching an underpad to the carpet structure as the latter is hot molded to conform to the desired contoured shape.

2 Claims, 4 Drawing Figures

MOLDABLE UNITARY COMPOSITE CARPET STRUCTURE

BACKGROUND OF THE INVENTION

The use of carpet on the floor surfaces of both the passenger compartments and the trunks of automobiles is well known. Since around 1956 it has become the practice to mold such carpet to conform to the shape of the floor surface (see U.S. Pat. No. 3,673,034). Frequently it is the practice to adhere a nonwoven felt layer (underpad) to the back of the carpet as the latter is being molded to shape. Such a carpet structure provides resilient, decorative wearing surface with heat insulating and sound deadening qualities.

The carpets used have been of two general types: those having an upper surface (pile) made with yarn tufts anchored in a backing, and those having an upper surface composed of a mass of individual fibers raised above a felted layer of the same fibers. While the pile yarn type of carpet can be made by weaving, knitting or tufting, the tufting process produces most of the pile yarn carpet used in automobiles today and tufted carpet will be used in this disclosure to represent all forms of pile yarn carpet.

The second broad type of carpet is called nonwoven and is made from batts of fiber by needlepunching. No pile yarn is used in making this type of carpet.

In service, rubbing and scuffing tend to pull pile fibers and tufts loose from the back of the carpet, leading to wearing out of the carpet. To minimize this loss of fibers and tufts, it is common practice to apply a back coating to the underside of the carpet. Such a coating is usually of latex or polyethylene.

Latex coatings tend to penetrate readily into the spaces between adjacent fibers in pile yarn or nonwoven felt and also are known to adhere readily to fiber surfaces so that good interfiber bonding is usually obtained with latex coatings. Latex coatings also provide good anchorage of pile yarn tufts (tuftbind) to the textile backing in pile yarn carpets.

Polyethylene coatings generally provide good tuftbind for tufted carpet but only marginal interfiber bonding in both tufted carpet and nonwoven carpet.

Once a carpet structure has been molded to the desired floor shape it is desirable to have the molded product or mat retain a memory for this shape permanently in handling, shipment and storage so that when the mat is installed in the automobile it conforms to the floor contour. The back coating applied to the underside of the carpet is a major factor in achieving this goal. While satisfactory mats have been made using latex coatings, recent manufacturing practice has been designed around polyethylene coated carpet because of the excellent shape retention properties of polyethylene in the temperature range of normal storage and use. Furthermore, the manufacturing process for making satisfactory molded mats with polyethylene back coatings is much more economical and flexible than with latex back coatings since latexed carpet must be dried after molding for satisfactory shape retention while the polyethylene coated carpet needs merely to be heated before molding and then cooled afterward for good shape retention.

The molding of polyethylene carpet is usually accomplished by placing a rectangular blank of carpet face down on a table under a radiant heater which brings the surface temperature of the polyethylene coating approximately to 400° F. The heated blank is then placed face up on a bottom mold and a top, mating mold is brought down so as to mold the carpet blank into the desired shape. When the molded carpet is cool, it retains this shape during storage, shipment and installation.

The polyethylene coating has the additional advantage of becoming tacky when hot so that it acts as the adhesive to bond the underpad to the carpet during the mat molding operation. In the mat molding operation the underpad is placed in the bottom mold as a separate layer before the hot carpet is introduced.

While the underpad, which makes the primary contribution to heat insulation and sound deadening, usually has been made with nonwoven needlepunched felt of inexpensive fibers such as jute, cotton and reused synthetic fibers, various synthetic foam layers have also been employed to a limited extent. These synthetic foam layers have been adhered to the back of the molded mat in the same manner as the nonwoven felt and generally have been of low density. Such use of synthetic foam layers has not been successful because the separate layer of foam does not deform readily in molding.

Since the emergence of flexible polyurethane foams, attempts have been made to produce molded mats with polyurethane foam underpadding directly adhered to the back of the carpet because polyurethanes are known to bond strongly to fiber and other surfaces. In the manufacture of polyurethane foams a solid is formed from a liquid mix by chemical reaction. When the chemical reaction is complete, the product is said to be cured. While the polyurethane foam is still in the liquid state it can be induced to penetrate the spaces between fibers in yarns or felts so as to provide a good interfiber bonding when cured (see U.S. Pat. No. 3,705,834). In addition, once polyurethane foam has been cured in one shape it resists being deformed permanently into another shape. These features early led to attempts to use polyurethane foam to provide fiberbond, tuftbind, sound deadening and shape retention in molded mats.

Three basic approaches have been employed in these attempts:

1. Cast a polyurethane foam layer on the back of the carpet while the carpet is in a horizontal position and, after the foam has cured, mold a section of the carpet-foam composite to the desired shape between mating molds.

2. Cast a polyurethane foam layer on the back of the carpet while the carpet is in a horizontal position and, while the foam is only partiallly cured, mold a section of the carpet-foam composite to the desired shape in mating molds and allow the foam to cure between the mating molds (see U.S. Pat. No. 3,175,936).

3. Deposit a polyurethane foam layer on the nonplanar surface of a bottom mold and, while the foam is only partially cured, place a section of carpet on top of the foam layer and mold the carpet into adhering contact with the foam layer and allow the foam to cure between the mating molds (see U.S. Pat. No. 3,046,177).

None of these methods have been successful. In the first method the carpet-foam composite did not retain the new shape after being removed from the mating molds. Even though thermoplastic formulations of polyurethane foam were used, the foam layer "remembered" the flat shape in which it was cured in preference to the molded shape.

The second method produces a permanently molded product but is not a practical production method both because the carpet-uncured foam composite must be used immediately and because curing in the molds greatly increases the cost of equipment required.

The third method also produces a permanently molded product but is not a practical production method because of greatly increased equipment costs arising from the need to have a foaming head for each pair of mating molds and the curing time increases the number of molds needed for a given amount of production.

It has therefore been the object of the invention to produce a composite carpet structure having not only good fiberbond, tuftbind and sound deadening qualities but also the capability of being deformed to nonplanar shapes permanently by hot molding as well as permitting the ready adherence of an underpad during molding.

SUMMARY OF THE INVENTION

A flat composite carpet structure having good fiberbond, tuftbind and sound deadening qualities, capable of being molded permanently into nonplanar shapes and also capable of having an underpad adhesively attached thereto, has a relatively thick layer of polyurethane foam adhered to the underside of the carpet fabric and a relatively thin layer of polyethylene foam adhered to the underside of the layer of polyurethane.

DESCRIPTION OF THE INVENTION

In accordance with the invention a unitary composite carpet structure having good tuftbind, fiberbond, sound deadening and shape retention qualities and capable of having an underpad adhesively attached thereto comprises a fabric layer, a relatively thick layer of polyurethane foam attached to the underside of the fabric layer of the carpet and a relatively thin layer of polyethylene attached to the underside of the layer of polyurethane.

Figure 1:
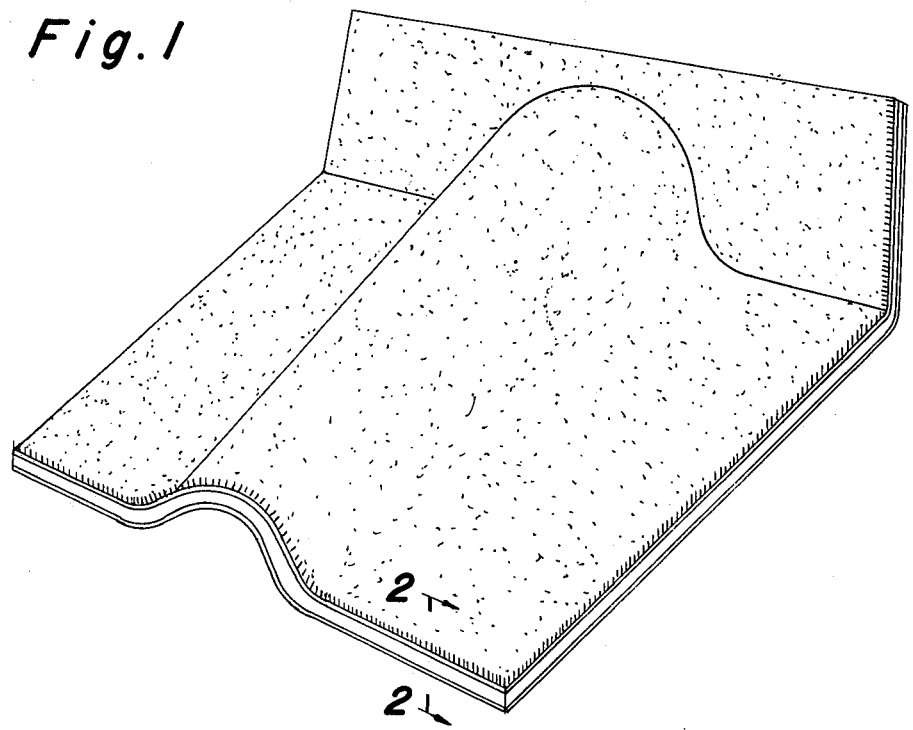
FIG. 1 is a perspective view of a molded mat made with the composite carpet structure of the invention.

In FIG. 1 of the drawings there is illustrated a carpet mat which is designed and constructed to fit a specified floor area having a contoured surface, whereby the carpet must be permanently formed in a similarly contoured shaped to fit the configuration of the floor. Such carpet mats are particularly useful for covering the floor surfaces of automobiles in which there are contours such as the hump over the transmission. It is desirable to make such carpet mats in such a way that a corresponding hump or other contour is built into the carpet mat during the course of manufacture and is retained while the mat is awaiting shipment or installation.

Figure 2:
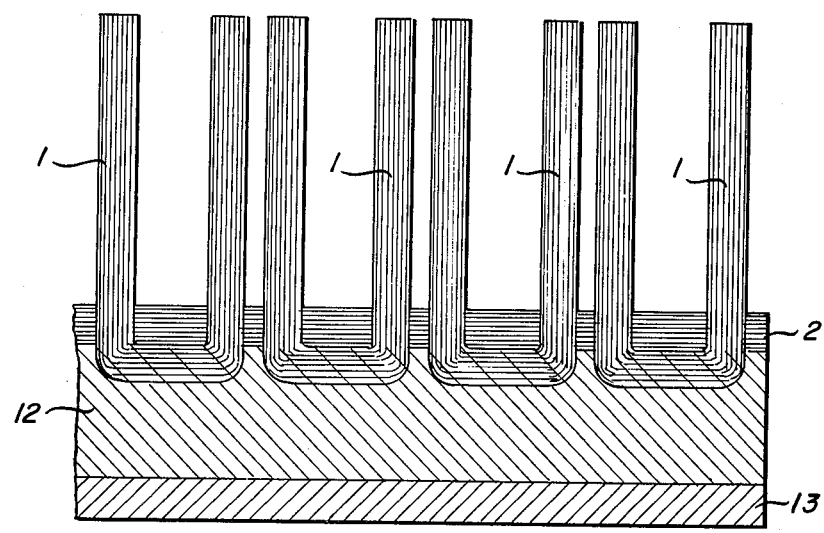
FIG. 2 is a vertical sectional view taken, for example, on line 2—2 of FIG. 1 and showing a tufted carpet in a composite carpet structure according to the invention.

In FIG. 2 of the drawings there is shown a vertical section through a unitary composite carpet mat structure provided by the present invention and having the good qualities and characteristics described above. This figure discloses, but only by way of example, a tufted carpet having a plurality of tufts 1 which in the disclosed example are U-shaped, but it will be explicitly understood that this invention is applicable to, and useful with, any textile carpet whether it be tufted, woven, non-woven, knitted or otherwise made. In accordance with conventional practice with a tufted carpet a primary backing 2 is provided through which the vertical fibers of each tuft extend, which backing may be made of jute, polypropylene or other conventional material. As stated above, the invention is applicable to all types of carpets, and in FIG. 3 of the drawings there is disclosed a carpet formed of a non-woven pile fabric 10 having a pile surface 11.

Figure 3:
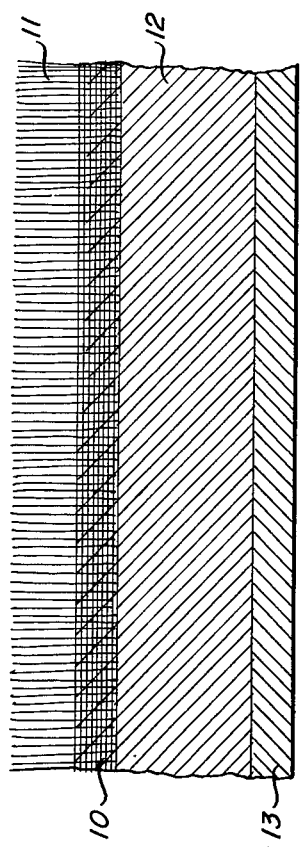
FIG. 3 is a view similar to FIG. 2 showing a non-woven carpet in a composite carpet structure according to the invention.

In accordance with the invention the underside of a flat textile carpet product, such as those shown in FIGS. 2 and 3 by way of example, has a relatively thick layer 12 of polyurethane foam attached thereto, and a relatively thin layer of sintered polyethylene 13 adhered to the underside of the layer of polyurethane foam, and such a unitary composite carpet will have the qualities and capabilities described above. As shown in FIGS. 2 and 3 the polyurethane foam permeates the adjacent carpet fabric and extends into the interstices between its tufts or groups and between the individual fibers thereof, providing the desired tuftbind and fiberbond. The distance of penetration of the polyurethane foam into the yarn tufts in pile yarn carpets of the type illustrated in FIG. 2 or into the felted fiber back portion of non-woven carpets of the type illustrated in FIG. 3 will depend on the density of the foam mix and other variables which are well known to those skilled in the art. The layer of polyurethane foam is cast onto the carpet fabric, whether such fabric has or does not have the primary backing, and a method of casting this layer onto the fabric is described later in this specification. The relatively thick layer of polyurethane foam provides sound deadening qualities and the relatively thin layer of sintered polyethylene provides shape retention qualities and, in addition, permits the adhesive attachment of an underpad to the unitary composite mat if this is desired.

The polyethylene layer 13 which is adhesively formed on the exterior or underside of the polyurethane foam layer provides shape retention qualities in the composite carpet mat. This layer is relatively thin with respect to the layer of polyurethane foam.

Figure 4:
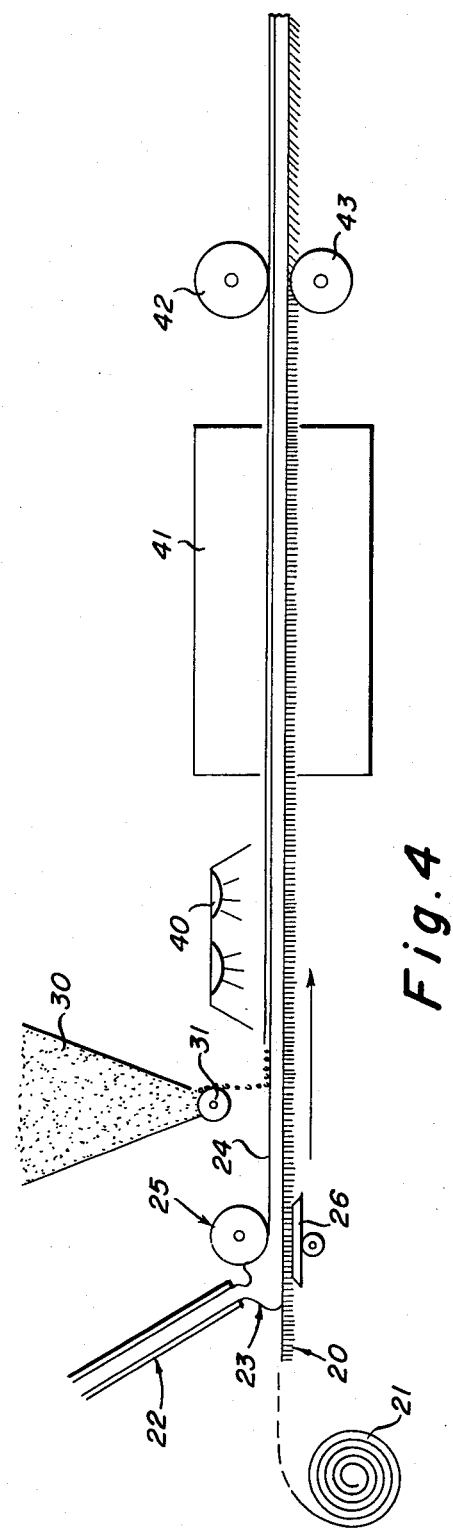
FIG. 4 is a schematic view illustrating the successive steps in the formation of the composite carpet structure of the invention.

In FIG. 4 of the drawings there are schematically disclosed the steps in a process of manufacture of the unitary composite carpet structure provided by the invention. In this process, textile carpet fabric 20 from roll 21 is moved, with its under side up, in a horizontal path past a supply hose 22 through which polyurethane foam mix 23 is supplied to the backside of the moving fabric in a layer 24, the thickness of which is determined by the distance between a horizontal doctor roll 25 and a backup plate 26. The carpet fabric with the polyurethane foam layer thereon then moves under a supply reservoir of powdered polyethylene at 30, and this material is supplied to the exposed surface of the polyurethane layer by the metering roll 31. Radiant heat is then applied at 40 to the layer of polyethylene powder causing the powder particles to soften and stick together so as to form a cohering sintered mass. The carpet and layers then pass through a hot air oven 41 where the polyurethane foam is cured, after which the mass of cohering polyethylene particles is flattened and further coalesced by passage between a chilled squeeze roll 42 and a back-up squeeze roll 43. The unitary composite carpet structure so produced may now be cut to size for hot molding to a desired shape.

In the foregoing specification and in the appended claims the polyurethane foam layer is referred to as being "relatively thick" and the polyethylene layer as being "relatively thin", both with respect to each other. In actual practice it has been found that the beneficial qualities and capabilities of the unitary carpet structure provided by the invention will be achieved if the polyurethane foam layer is between 1/16 and ¼ of an inch in thickness and that of the sintered polyethylene layer is between 5 and 15 thousanths of an inch. However, these values are not critical but only representative of thicknesses of the layers which have been found to be successful.

It will be understood that within the scope of the invention different degrees of fiberbond, tuftbind, sound deadening, shape retention and underpad adherence are possible depending primarily on the formulation and density of the polyurethane foam foam and on the quantities of polyurethane and polyethylene sintered chosen. These variations can be made routinely by anyone skilled in the art in accordance with performance and cost objectives to be met.

I claim:

1. As a new article of manufacture, a flat unitary composite carpet structure having good fiberbond, tuftbind and sound deadening qualities and being capable of being heat molded permanently into nonplanar shape and also capable of having an underpad adhesively attached to its underside, comprising a textile fabric, a relatively thick layer of cured polyurethane foam adhered to the underside of the textile fabric, and a layer of coalesced polyethylene powder adhered to the underside of the layer of polyurethane.

2. The new article of manufacture according to claim 1, in which the layer of polyurethane foam is between 1/16 and ¼ inch in thickness and the layer of sintered polyethylene powder is between 5 and 15 thousandths of an inch in thickness.

* * * * *